United States Patent [19]

Kreuter

[11] 4,384,492

[45] May 24, 1983

[54] LINEAR AIR VELOCITY TRANSMITTER, SQUARE ROOT EXTRACTOR DEVICE THEREFOR AND METHODS OF MAKING THE SAME

[76] Inventor: Kenneth G. Kreuter, 1230 Centennial Dr., Thief River Falls, Minn. 56701

[21] Appl. No.: 240,768

[22] Filed: Mar. 5, 1981

[51] Int. Cl.³ .............................................. G01F 1/00
[52] U.S. Cl. ................................................ 73/861.48
[58] Field of Search ..................................... 73/861.48

[56] References Cited

U.S. PATENT DOCUMENTS

| | | | |
|---|---|---|---|
| 1,638,102 | 8/1927 | Roucka | 73/861.48 |
| 2,351,745 | 6/1944 | Donaldson | 73/861.48 |
| 2,509,078 | 5/1950 | Stover | 73/861.48 |
| 2,672,151 | 3/1954 | Newbold | 73/861.48 |
| 2,692,501 | 10/1954 | Erwood | 73/861.48 |
| 2,992,559 | 7/1961 | Martz et al. | 73/861.48 |
| 3,444,736 | 5/1969 | Stedman | 73/861.48 |

OTHER PUBLICATIONS

Page 7 of the Operating Manual entitled Operating Manual, "Force Bridge," of Sorteberg Controls Company.
Pages 1 and 2 of the Technical Information Bulletin, T137-55B of the Foxboro Company.

*Primary Examiner*—Howard A. Birmiel
*Attorney, Agent, or Firm*—Candor, Candor & Tassone

[57] ABSTRACT

A differential pressure transmitter having structure for producing an output pneumatic signal from a pneumatic source in relation to the air velocity pressure of air flowing in the passage structure that senses the difference between the total pressure and the static pressure of the air flowing in the passage, and structure for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter. The structure for extracting the square root comprises a substantially flat cam surface.

40 Claims, 5 Drawing Figures

LINEAR AIR VELOCITY TRANSMITTER, SQUARE ROOT EXTRACTOR DEVICE THEREFOR AND METHODS OF MAKING THE SAME

BACKGROUND OF THE INVENTION

1. Field of the Invention

This invention relates to an improved differential pressure transmitter that comprises a linear air velocity transmitter and to a pneumatically operated square root extractor device for such a transmitter or the like. This invention also relates to methods of making such a transmitter and/or such a square root extractor device.

2. Prior Art Statement

It is known to provide a differential pressure transmitter having means for producing an output pneumatic signal from a pneumatic source in relation to the air velocity pressure of air flowing in a passage defining means as defined by means of the transmitter that senses the difference between the total pressure and the static pressure of the air flowing in the passage defining means.

However, such output signal is non-linear with respect to the air velocity and in order to provide a linear signal, it is necessary to linearize the output pressure signal of the differential pressure transmitter by directing the output pneumatic signal of the transmitter to the input port of a separate square root extractor device which extracts the square root from the input pneumatic signal thereto to provide a linear output pneumatic signal.

For example, two such known separate pneumatically operated square root extractors are described in the following two publications:

(1) Page 7 of the operating manual entitled Operating Manual "Force Bridge", of Sorteberg Controls Company, South Norwalk, Conn.

(2) Pages 1 and 2 of the Technical Information Bulletin TI 37-55B, dated August, 1969, and entitled "557 Series Pneumatic Square Root Extractor" of The Foxboro Company, Foxboro, Mass.

It appears that the pneumatically operated square root extractor of Item (1) above moves a pair of rollers between a pair of flapper levers disposed in parallel relation and respectively controlling a pair of bleed nozzles, the pair of rollers being driven in unison by a pneumatically operated movable wall means to change the fulcrum points of the flapper levers and thereby extracting the square root from the input pneumatic signal.

It appears that the pneumatic square root extractor of Item (2) above has a flapper lever controlling a bleed nozzle and being interconnected to a flexure point which has the flexure angle thereof changed by a movable wall so as to extract the square root from the input pneumatic signal.

SUMMARY OF THE INVENTION

It is one feature of this invention to provide a differential pressure transmitter that will act as a linear air velocity trnsmitter.

In particular, it is well known that the air flow in an air duct is normally sensed by means of a sensing element located in the moving air stream, such as by a pitot-tube, an air-velocity measuring station, or other similar device, whereby the two pressures from the sensing element (total pressure and static pressure) are normally directed to a low-range differential pressure transmitter wherein the difference in the two signals (velocity pressure) is transduced into an output pneumatic signal, usually 3 to 15 psig over the span of the transmitter. If the pneumatic output signal of such a differential pressure transmitter is linear with respect to the difference between the two sensed pressures, that output pneumatic signal will vary as the square of changes in air velocity, since air velocity pressure (total pressure minus static pressure) varies as the square of the air velocity.

In order to obtain control of the air velocity, the output pneumatic signal of the low-range differential pressure transmitter is frequently used as a pilot signal to a pneumatic receiver-controller, which in turn operates the final control device which varies the air flow. Assuming good quality control components and an operable air-handling system, good signal-point control may be obtained with this prior known arrangement, even though the output pneumatic signal of the differential pressure transmitter is non-linear with respect to the air velocity.

However, in cases where it is necessary to acurately maintain a linear relationship between the velocites of two air streams, it is necessary to linearize the output pneumatic signals of the two differential pressure transmitters used for each air stream and this is conventionally accomplished through the use of pneumatic square root extracting relays or equivalent devices.

In particular, the output pneumatic signal of each transmitter is connected to the input port of a separate square root extractor device. The output signals of both square root extractors are then connected to some type of pneumatic signal comparing device, such as an adjustable signal comparing pneumatic relay or an adjustable pneumatic receiver-controller, to allow the linear output of one square root extractor to be changed by the effect of the linear output of the other square root extractor upon the signal comparing device. By making adjustments to the singal comparing device, the velocities of the two air streams may be matched, the velocity of one air stream may be made to lag the other in linear fashion, or the velocity of the one air stream may be used to lead the other in linear fashion, as desired.

However, it was found according to the teachings of this invention that a differential pressure transmitter can include a pneumatically operated square root extractor therein to extract the square root from the pneumatic output signal of the transmitter as it is being produced whereby a single device can provide the above function of the prior known differential pressure transmitter and separate square root extractor device in order to provide a linear output pneumatic signal with respect to air velocity whereby the differential pressure transmitter of this invention comprises a linear air velocity transmitter.

In particular, one embodiment of this invention provides a differential pressure transmitter comprising means for producing an output pneumatic signal from a pneumatic source in relation to the air velocity pressure of air flowing in a passage, means that senses the difference between the total pressure, and the static pressure of the air flowing in the passage, and means for extracting the square root of the air velocity pressure of the air from the pneumatic output signal as the pneumatic output signal is being produced so that the output signal is substantially linear with respect to the air velocity of the air flow in the passage whereby the transmitter comprises a linear air velocity transmitter. The means for extracting the square root comprises a substantially flat cam surface.

Therefore, it can be seen that the improved differential pressure transmitter of this invention not only reduces the number of devices which must be used in order to provide a linear air velocity output signal, but also the differential pressure transmitter of this invention eliminates the additive error which would be introduced by the use of a second control device as in the past.

In addition, it was found according to the teachings of this invention that an improved pneumatically operated square root extractor is provided by the unique square root extractor means of the above described differential pressure transmitter of this invention.

In particular, one embodiment of the improved pneumatically operated square root extracting device of this invention has means for extracting the square root of an input signal from an output pneumatic signal thereof and comprises a movable moment-arm acting on a flapper lever that controls a bleed nozzle of the device, the device having a movable wall carried by the device and defining an output signal chamber therewith whereby the position of the wall is determined by the pressure in the output signal chamber. The wall is operatively interconnected to the moment-arm to position the same relative to the flapper lever in relation to the pressure in the output signal chamber, the moment-arm having an engagement part that engages the flapper lever. An inclined plane is disposed adjacent the flapper lever in such a manner that the engagement part of the moment-arm is engageable with the flapper lever and the inclined plane.

Accordingly, it is an object of this invention to provide an improved differential pressure transmitter having one or more of the novel features of this invention as set forth above or hereinafter shown or described.

Another object of this invention is to provide a method of making such a differential pressure transmitter, the method of this invention having one or more of the novel features of this invention as set forth above or hereinafter shown or described.

Another object of this invention is to provide an improved pneumatically operated square root extractor having one or more of the novel features of this invention as set forth above or hereinafter shown or described.

Another object of this invention is to provide a method of making such a pneumatically operated square root extractor, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
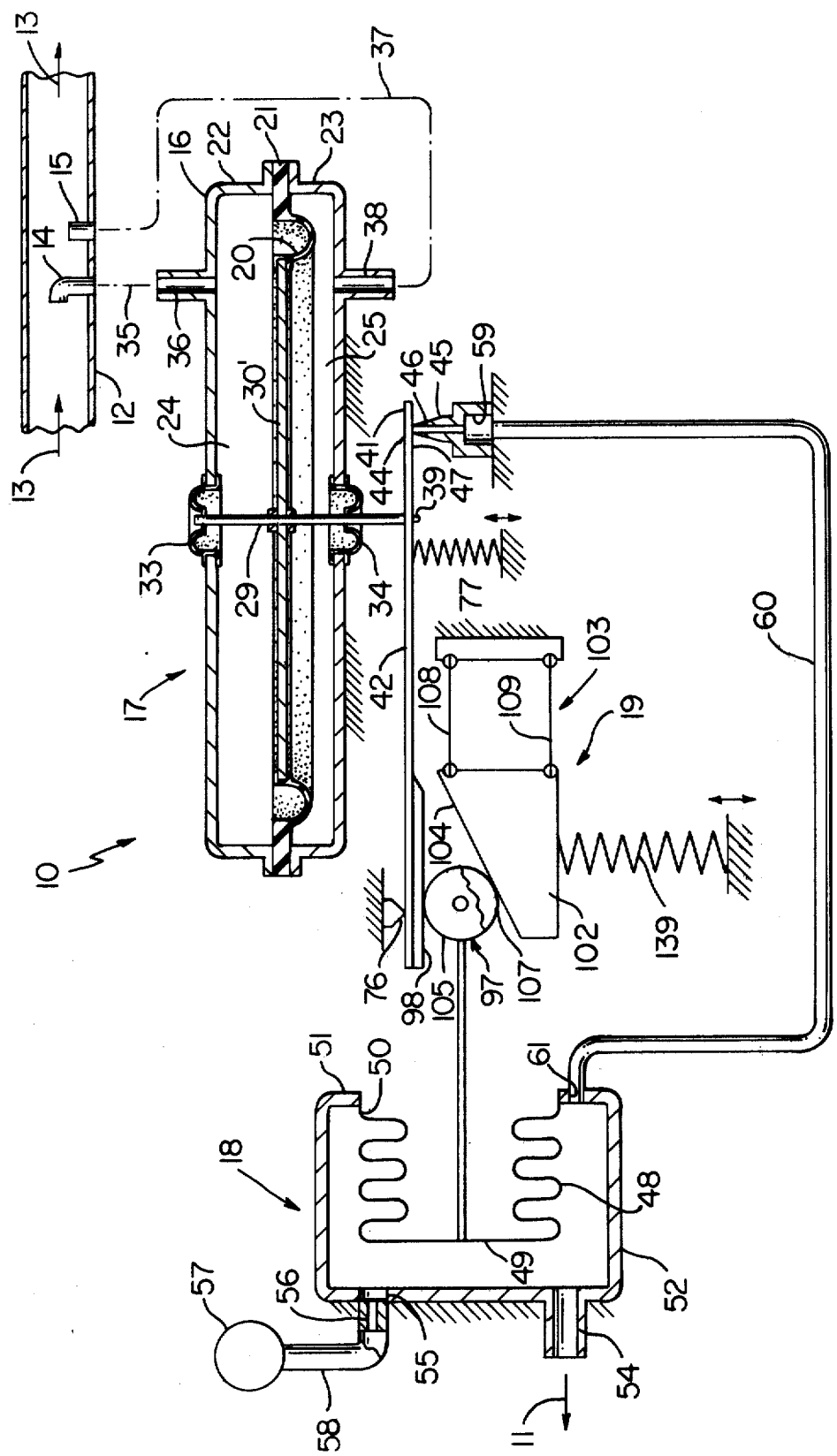
FIG. 1 is a schematic view, partially in cross section, illustrating the improved pressure differential transmitter of this invention for measuring the air velocity of air flowing in a duct and providing a substantially linear output pneumatic signal with respect to that air velocity.

While the various features of this invention are hereinafter described and illustrated as being particularly adapted to provide a linear air velocity transmitter, it is to be understood that the various features of this invention can be utilized singly or in any combination thereof to provide a pneumatically operated control device for other purposes as desired.

Therefore, this invention is not to be limited to only the embodiments illustrated in the drawings, because the drawings are merely utilized to illustrate one of the wide variety of uses of this invention.

Referring now to FIG. 1, the improved differential pressure transmitter of this invention is generally indicated by the reference numeral 10 and is shown schematically in a system in FIG. 1 for providing a substantially linear output pneumatic signal 11 in relation to the air velocity flowing in a passage defining means 12 and represented by the arrows 13 and as measured by a pitot-tube arrangement wherein a tube 14 disposed in the passage defining means 12 senses the total pressure of the air velocity 13 in the duct 12 and a tube 15 measures the static pressure of the air 13 flowing in the duct 12 in a manner well known in the art.

Figure 2A:
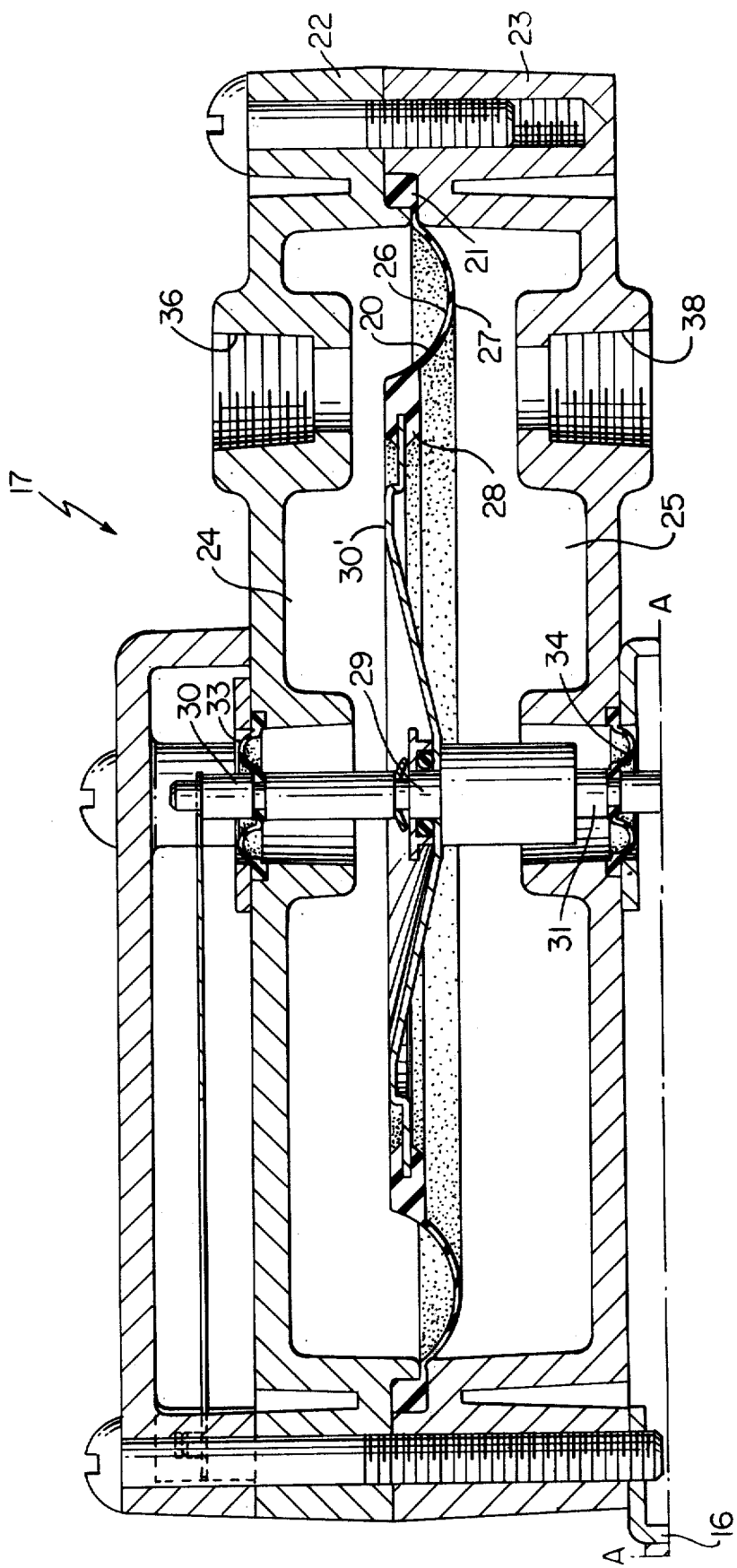
FIG. 2A is a cross-sectional view of the improved differential pressure transmitter of this invention and is to be joined to FIG. 2B by having the line A—A of FIG. 2A superimposed on line A—A of FIG. 2B.
Figure 2B:
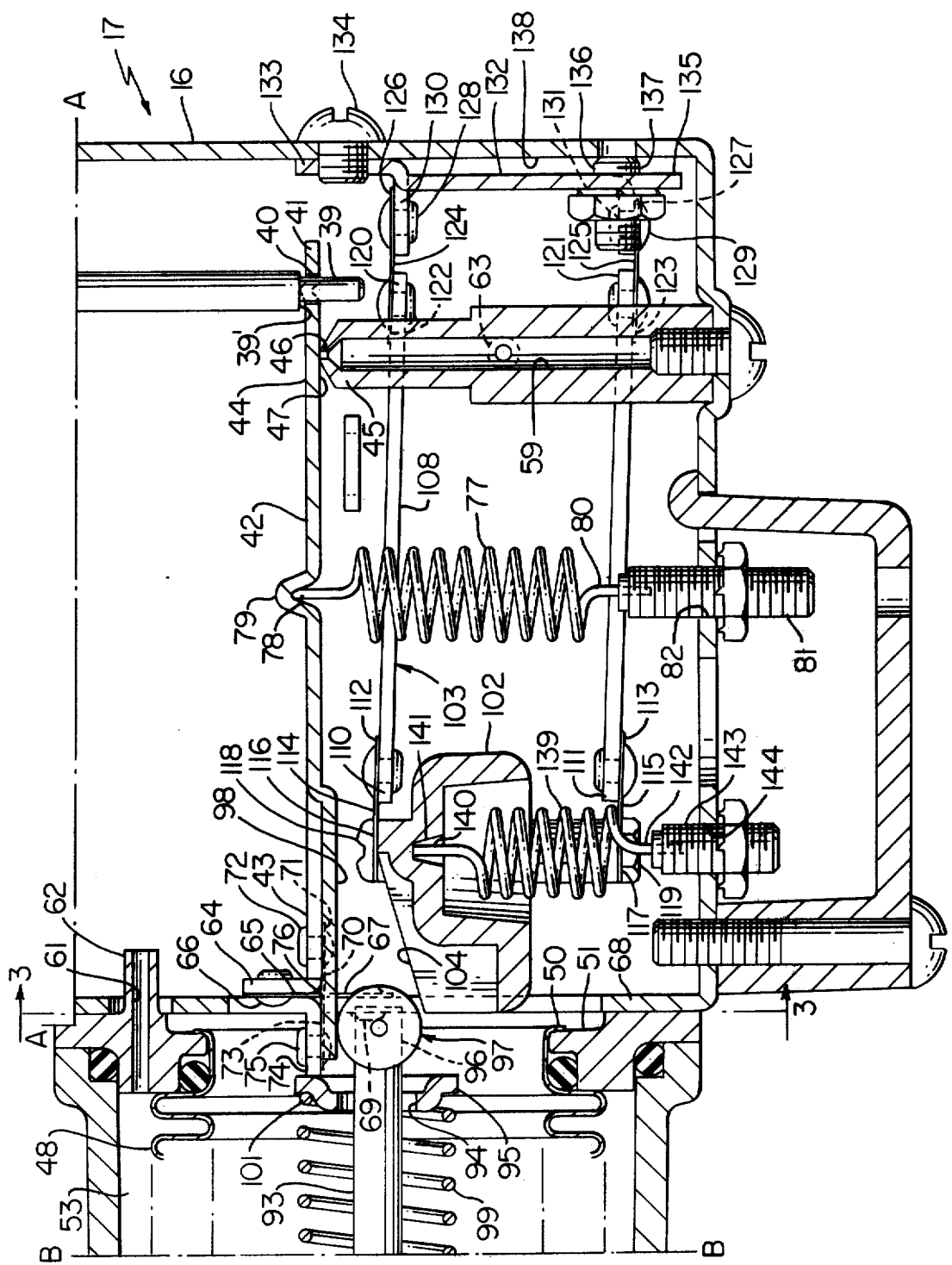
FIG. 2B is a cross-sectional view of part of the differential pressure transmitter of this invention and not only is to be joined to FIG. 2A by having the line A—A thereof superimposed on the line A—A of FIG. 2A, but is also to have the structure of FIG. 2C joined thereto by having the line B—B of FIG. 2C superimposed on line B—B of FIG. 2B.
Figure 2C:
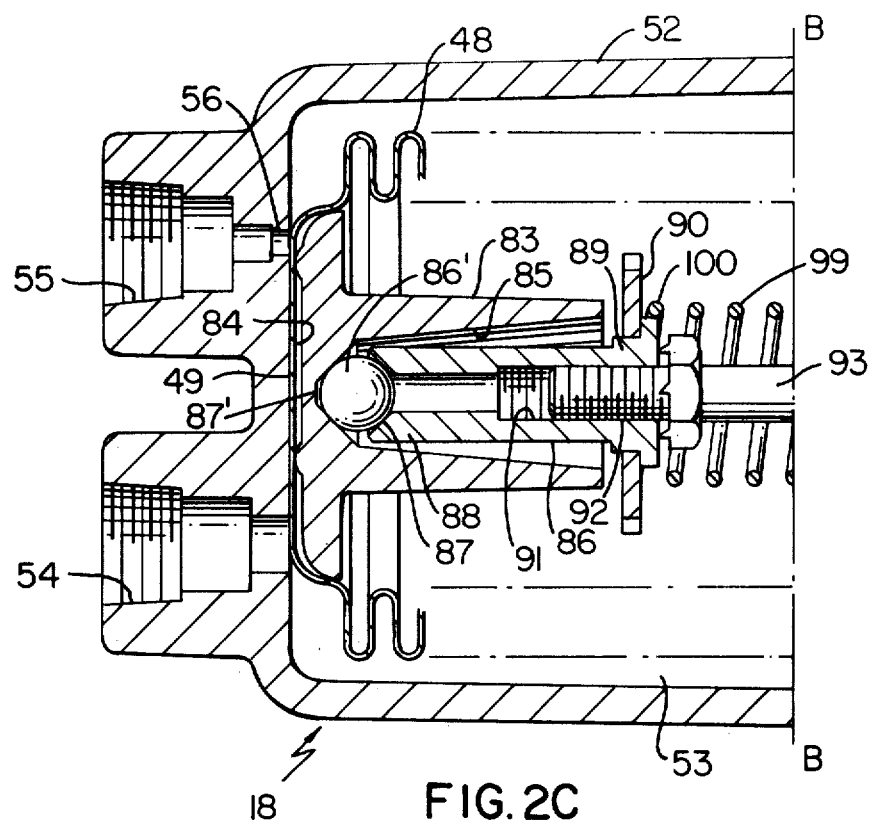
FIG. 2C is a cross-sectional view of part of the differential pressure transmitter of this invention and is to be joined to FIG. 2B by having the line B—B thereof superimposed on the line B—B of FIG. 2B.

The differential pressure transmitter 10 of this invention is a single, self-contained control device having a housing means 16 formed from a plurality of parts suitably interconnected together as illustrated in FIGS. 2A, 2B and 2C to define a differential pressure measuring portion or means that is generally indicated by the reference numeral 17, an output pneumatic signal producing portion or means that is generally indicated by the reference numeral 18 and a square root extractor portion or means that is generally indicated by the reference numeral 19.

As illustrated in FIGS. 1 and 2A, the means 17 for measuring the differential pressure comprises a flexible diaphragm 20 having its outer periphery 21 secured between a pair of housing parts 22 and 23 to cooperate therewith to define a pair of chambers 24 and 25 on opposite sides 26 and 27 of the diaphragm 20, the inner periphery 28 of the flexible diaphragm 26 being interconnected to a post means 29 by a retainer 30' with the post means 29 having its opposed ends 30 and 31 respectively secured in sealing relation to the housing part 22 and 23 by balancing diaphragms 33 and 34.

The chamber 24 is adpated to be interconnected to the tube 14 that measures the total pressure of the air 13 flowing in the duct 12 by having a suitable conduit means 35, FIG. 1, interconnected to an inlet port means 36 of the housing means 22 whereas the tube 15 that measures the static pressure of the air 13 flowing in the duct 12 is adapted to be interconnected by a conduit means 37, FIG. 1, to an inlet port means 38 of the housing part 23 that leads to the chamber 25.

In this manner, the diaphragm means 26 and, thus, the post means 29 is positioned in the transmitter 10 in relation to the difference between the total pressure of the chamber 24 and the static pressure in the chamber 25 so as to cause the output pneumatic signal producing means 18 to produce a signal in relation to the position of the post means 29 in a manner hereinafter described.

The post means 29 of the differential pressure measuring means 17 has a reduced end 39, FIGS. 1 and 2B, that passes through an opening 40 in an end 41 of a flapper lever 42 that has its other end 43 pivotally mounted to the housing means 16 in a manner hereinafter set forth whereby a shoulder 39' of the post means 29 will bear against the lever 42, the flapper lever 42 having a part 44 thereof that controls the amount of opening of a nozzle means 45 that has its nozzle opening 46 directed against the underside 47 of the flapper nozzle 42 as illustrated in FIGS. 1 and 2B.

In this manner, the differential pressure measuring means 17 is operatively interconnected to the flapper lever 42 to control movement thereof as will be apparent hereinafter and, thus, is operatively interconnected to the output pneumatic signal producing means 18.

The output pneumatic signal producing means 18 comprises a flexible bellows construction 48 having a closed end 49 and an opposed open end 50, the open end 50 being sealingly secured to an internal housing plate 51 which, in turn, is sealed to a cup-shaped housing part 52 that cooperates with the bellows construction 48 to define a chamber 53 therebetween. An output signal port means 54 of the housing part 52 is in fluid communication with the chamber 53 and a pneumatic source port means 55 is formed in the housing part 52 to be disposed in fluid communication with the chamber 53 and has a restriction means 56 therein, the inlet port means 55 being adapted to be interconnected to a suitable pneumatic pressure source by the conduit means 58.

The nozzle means 45 has its interior chamber 59 disposed in fluid communication with the chamber 53 by a conduit means 60 as illustrated in FIG. 1, the conduit means 60 being adapted to be interconnected to a port means 61 as illustrated in 2B by having one end thereof slipped on a nipple means 62 so as to be disposed in fluid communication with the chamber 53 while the other end thereof is adapted to be disposed on a nipple means 63 of the nozzle means 45 as illustrated in FIG. 2B that leads to the chamber 59 of the nozzle means 45.

In this manner, the pneumatic pressure source 57 directs fluid pressure into the chamber 53 and the output pressure passing out of the output nipple 54 comprises the output pneumatic pressure signal 11 that is controlled by the amount of bleed permitted through the nozzle means 45 by the force of the flapper lever 42 against the nozzle opening 46 as will be apparent hereinafter.

Figure 3:
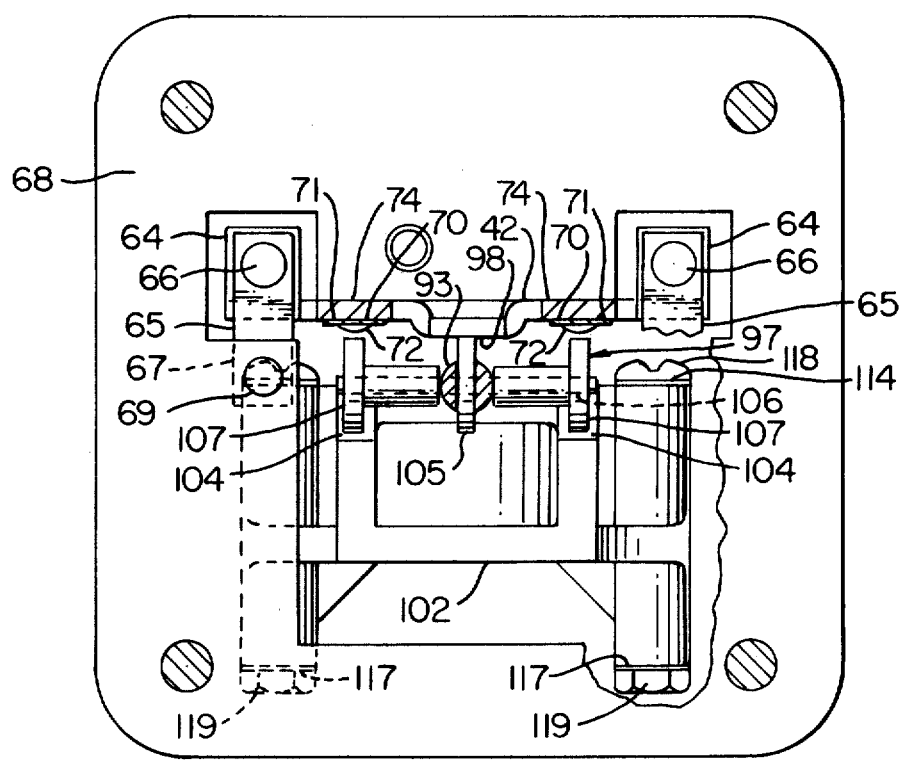
FIG. 3 is a cross-sectional view taken on line 3—3 of FIG. 2B.

The flapper lever 42 has the end 43 thereof provided with a pair of spaced apart and upturned flanges 64 disposed substantially at right angles relative thereto, the upstanding flanges 64 as illustrated in FIGS. 2B and 3 being respectively interconnected to leaf springs or flexures 65 by rivet-like fastening members 66 while the other ends 67 of the flexures 65 are secured to a housing plate 68 by rivet-like fasteners 69.

The upstanding flanges 64 of the flapper lever 42 are disposed outboard of another pair of flexures 70 that have one ends 71 thereof secured to the flapper lever 42 by fastening members 72 while the other ends 73 of the flexures 70 are secured to outwardly directed flanges 74 of the plate 68 by fastening members 75.

In this manner, the pair of vertically disposed flexures 65, as illustrated in FIG. 2B, cross the horizontally disposed fixtures 70 at the point 76 as illustrated in FIG. 2B whereby the point 76 comprises a substantially frictionless pivot point for the flapper lever 42 in the transmitter 10.

A coiled compression range spring 77 has one end 78 thereof bearing against the lever 42 on the side 47 thereof and being received in a notched portion 79 of the lever 42 while the other end 80 of the range spring 77 is carried by a threaded adjusting member 81 threadedly disposed in a threaded bore 82 in the housing means 16 so as to provide means for adjusting the amount of force of the range spring 77 tending to urge the flapper lever 42 in FIG. 2B in a counter-clockwise direction so as to tend to increase the amount of bleed of the fluid pressure through the nozzle opening 46 in opposition to the downward force of the lever 44 under the influence of the downward force on the post means 29 by the differential pressure measuring means 17 as will be apparent hereinafter.

A rigid cup-shaped retaining member 83 is secured to the wall 49 so as to move in unison therewith, the rigid member 83 having a substantially conical opening 85 provided therein and having a ball 86' secured in the end 87' of the opening 85.

In this manner, a tubular member 86 having a conical opening 87 in one end 88 thereof bears against the ball 86' so as to permit rotational movement therebetween as will be apparent hereinafter, the other end 89 of the tubular member 86 carrying a gear-like disc 90 thereon so that the gear-like disc 90 can be rotated by a suitable adjusting tool to cause the tubular member 86 to rotate in unison therewith and act against the ball 86' at the end 88 to provide for such rotational movement between the tubular member 86 and the fixed rigid member 83 of the bellows construction 48.

The tubular member 86 has a threaded bore 91 in the end 89 thereof and threadedly receives a threaded end 92 of a rod 93 which extends through an opening 94, FIG. 2B, of a spring retainer 95 carried by the flange means 74 of the plate 68 so that an end 96 of the rod 93 can carry a roller means or engagement means 97 for engaging against a flat undersurface 98 of the lever 42 for a purpose hereinafter described.

A coiled compression spring 99 is telescoped over the rod 93 and has one end 100 bearing against the gear disc 90 of the tubular member 86 while the other end 101 bears against the spring retainer 95 so that the force of the compression spring 99 maintains the end 88 of the tubular member 86 against the ball 86' of the fixed rigid member 83 so that the engagement means 97 of the rod 93 will move in unison with the wall 49 of the bellows construction 48 for a purpose hereinafter described.

The square root extractor portion of means 19 of the transmitter 10 of this invention includes an inclined plane means 102 carried by a flexible parallelogram bracket arrangement 103 as hereinafter described so that an inclined surface means 104 of the member 102 will be disposed adjacent the surface 98 of the flapper lever 42 and provide a ramp against which the roller means 97 can engage and tend to urge the roller means 97 upwardly as the roller means 97 is moved to the right in FIG. 2B beyond the pivot point 76 of the lever 42 by the wall 49 of the bellows construction 48 being urged to the right by an increase in pressure in the chamber 53 as ill be apparent hereinafter.

As illustrated in FIG. 3, the roller means 97 of the rod 93 comprises a middle roller 105 rotatably mounted on a transverse pin 106 carried by the end 96 of the rod 93 while a pair of outboard rollers 107 are also mounted on the pin 106 and comprises part of the roller means 97, the rollers 105 and 107 being of the same diameter.

The inclined plane means 102 has a pair of spaced apart and like inclined surfaces 104 againt which the two outboard rollers 107 of the roller means 97 are adapted to engage whereas the middle roller 105 does not engage such inclined surfaces 104 but does engage against the surface 98 of the flapper lever 42 as illustrated in FIG. 3.

The flexible parallelogram mounting arrangement 103 comprises an upper arm means 108 and a lower arm means 109 respectively having ends 110 and 111 interconnected to ends 112 and 113 of flexure means 114 and 115 which in turn have the other ends 116 and 117 thereof secured to the inclined plane member 102 by fastening members 118 and 119 as illustrated in FIGS. 2B and 3.

The other ends 120 and 121 of the upper and lower arm means 108 and 109 are respectively interconnected to ends 122 and 123 of flexure means 124 and 125 which respectively have the other ends 126 and 127 thereof secured by fastening means 128 and 129 to out turned flange means 130 and 131 of an adjustable plate 132 carried by the housing means 16.

In particular, the plate 132 has its upper end 133 secured to the housing means 16 by fastening means 134 while its lower end 135 carries threaded adjusting means 136 having end means 137 abutting against the surface 138 of the housing means 16 so that threading the adjusting means 136 inwardly or outwardly in suitable threaded opening means of the plate 132 will cause the plate 132 to pivot at the fastening means 134 and thereby position the parallelogram arrangement 103 relative to the housing means 16 and, thus, position the inclined plane member 102 relative to the housing means 16.

A coiled compression range spring 139 has one end 140 thereof bearing against the inclined plane means 102 by being received in a cavity 141 thereof while the other end 142 of the range spring 139 is carried by a threaded adjusting member 143 threaded in a suitable threaded bore 144 of the housing means 16. In this manner, the force of the compression spring 139, as adjusted by the adjusting member 143, will tend to oppose downward movement of the inclined plane means 102 away from the surface 98 of the flapper valve 42 as the roller means 97 is moved to the right in the drawings beyond the pivot point 76 of the lever 42 as will be apparent hereinafter.

In order to calibrate the transmitter 10, a pressure of approximately 3 psig is imposed in and maintained in the chamber 53 to act on the wall 49 of the bellows construction 48 and move the wall 49 relative to the force of the compression spring 99 to a certain position. At this time the retainer 86 is rotated by a suitable tool engaging the gear disc 90 to thread the rod 93 inwardly or outwardly as the case may be so that the roller means 97 of the rod 93 has its middle roller 105 in engagement with the surface 98 of the flapper lever 42 immediately below the flexure or pivot point 76 of the lever 42.

After such calibration and when the pressure in the chamber 53 increases beyond 3 psig, the wall 49 will move further to the right in the drawings and cause the roller means 97 to move further to the right beyond the pivot point 76 and thereby through its engagement with the inclined plane means 104 and the surface 98 of the flapper lever 42 will increase the length of its moment arm acting on the lever 42 in a direction tending to move the end 44 thereof away from the nozzle end 46 as will be apparent hereinafter to extract the square root of the air velocity from the output pneumatic signal being produced in the chamber 53 as the output pneumatic signal is being produced as will be apparent hereinafter.

From the above, it can be seen that the differential pressure transmitter 10 of this invention can be formed from a relatively few parts to operate in a manner now to be described.

When the pneumatic source 57 in interconnected to the inlet port means 55 of the transmitter 10 and the differential pressure measuring means 17 has the port means 36 and 38 thereof respectively interconnected to the tubes 14 and 15, the total pressure of the air velocity 13 in the duct 12 is received in the chamber 24 and the static pressure of the air 13 flowing in the duct 12 is received in the chamber 25 so that the difference between such pressures causes the diaphragm means 20 to tend to move downwardly and, thus, cause the rod 29 to tend to move downwardly therewith and impose a certain force on the flapper lever 42 in a direction to tend to move the same in a clockwise direction in opposition to the force of the range spring 77 and tend to close off the opening 46 of the nozzle means 45 so as to permit the pressure to build up in the chamber 53 of the signal producing means 18 to correspond with such downward force of the diaphragm 20. However, as the pressure in the chamber 53 builds up, the wall 49 is being moved to the right in FIG. 1 and causing the roller means 97 to act against the inclined plane means 104 and the surface 98 of the flapper lever 42 in such a manner that the same tends to move the flapper lever 42 in a counterclockwise direction in opposition to the downward force of the diaphragm 20 to thereby tend to reduce the pressure buildup in the chamber 53.

By so designing the angle of the inclined plane means 104 and the roller means 97, it is found that the square root of the air velocity pressure being measured by the measuring means 17 is being subtracted from the pneumatic signal being produced in the chamber 53 as that pneumatic signal is being produced so that the output pneumatic signal 11 passing out of the outlet 54 of the signal producing means 18 is substantially linear to the air velocity in the duct 12 as the same increases or decreases.

Thus, it can be seen that the combination of the increased moment-arm of the engagement means 97 on the flapper lever 42 and the simultaneous increase in the force applied to the roller means 97 by the inclined plane surface means 104 in an upward direction in the drawings as the bellows construction 48 is compressed and extends the roller means 97 to the right in the drawings causes the transmitter 10 to output a pneumatic signal from the chamber 53 which is proportional to the square root of the air velocity pressure input signal, i.e., produces an output pneumatic signal 11 which is linear with respect to the air velocity in the duct 12. Thus, in effect, the square root of the differential pressure input signal as provided by the movement of the rod 29 in a downward direction by the differential pressure measuring means 17 is extracted from the output signal of the chamber 53 of the transmitter 10 as that output signal is being generated in the chamber 53 of the transmitter 10.

Therefore, it can be seen that the transmitter 10 of this invention extracts the square root from the output pneumatic signal as it is being produced by the transmitter 10 so that the single device 10 acts as a linear air velocity transmitter rather than requires a first device to produce a signal from which a square root must be extracted by a separate square root extractor as in the past, whereby the number of devices utilized by this invention not only is reduced, but also the transmitter 10 tends to eliminate the additive error that will be introduced by a second device as in the prior known arrangement.

While it is believed that other structure could be utilized to provide the square root extracting means or portion 19 of this invention in order to cause the transmitter 10 to act as a linear air velocity transmitter wherein the square root of the air velocity is being subtracted from the output pneumatic signal as the output pneumatic signal is being produced, it has been found that the transmitter 10 illustrated in FIGS. 2A, 2B and 2C acurately provides such function when the length of the lever arm 42 from its pivot point 76 to the center line of the post means 29 is approximately 2.750 of an inch and the inclined plane means 102 has the inclined plane surfaces 104 thereof disposed at an angle of approximately 16° relative to the horizontal, the other parts of such transmitter 10 being substantially in the same scale relation to such given dimensions for the lever 42 and the inclined plane means 102 substantially as proportionally represented by the structure illustrated in FIGS. 2A, 2B and 2C. However, it is to be understood that such dimensions of the parts of the transmitter 10 illustrated in FIGS. 2A, 2B and 2C are not to be considered limitations on the claimed features of this invention and are merely given as a working example of the same.

Accordingly, it can be seen that this invention not only provides an improved pressure transmitter and method of making the same, but also this invention provides an improved pneumatically operated square root extractor and method of making the same.

While the forms and methods of this invention now preferred have been illustrated and described as required by the Patent Statute, it is to be understood that other forms and method steps can be utilized and still fall within the scope of the appended claims.

What is claimed is:

1. In a differential pressure transmitter comprising means for producing an output pneumatic signal from a pneumatic source in relation to the air velocity pressure of air flowing in a passage, means that senses the difference between the total pressure and the static pressure of said air flowing in said passage, and means for extracting the square root of said air velocity pressure of said air from said pneumatic output signal as said pneumatic output signal is being produced so that said pneumatic output signal is substantially linear with respect to said air velocity of said air flow in said passage whereby said transmitter comprises a linear air velocity transmitter, the improvement wherein said means for extracting the square root comprises a substantially flat cam surface.

2. A differential pressure transmitter as set forth in claim 1 wherein said means that senses said difference between the total pressure and the static pressure comprises a housing having a pair of chambers separated from each other by a flexible diaphragm whereby one of said chambers is for receiving said total pressure therein and the other of said chambers is for receiving said static pressure therein.

3. A differential pressure transmitter as set forth in claim 2 wherein said flexible diaphragm has a post that transmits movement of said diaphragm to said means for producing said output pneumatic signal.

4. A differential pressure transmitter as set forth in claim 3 wherein said means for producing said output pneumatic signal comprises a bleed nozzle and a pivotally mounted flapper lever for controlling said bleed nozzle, said post being operatively interconnected to said flapper lever to control the same.

5. A differential pressure transmitter as set forth in claim 4 and including a range spring carried by said transmitter and being operatively interconnected to said flapper lever to tend to move said lever relative to said nozzle.

6. A differential pressure transmitter as set forth in claim 1 wherein said means for producing said output pneumatic signal comprises a bleed nozzle carried by said transmitter and a flapper lever pivotally carried by said transmitter for controlling said bleed nozzle.

7. A differential pressure transmitter as set forth in claim 6 wherein said means that senses the difference between the total pressure and the static pressure is operatively associated with said flapper lever to control the same.

8. A differential pressure transmitter as set forth in claim 7 wherein said means for extracting the square root of said air velocity pressure is also operatively associated with said flapper lever to control the same.

9. In a differential pressure transmitter comprising means for producing an output pneumatic signal from a pneumatic source in relation to the air velocity pressure of air flowing in a passage, means that senses the difference between the total pressure and the static pressure of said air flowing in said passage, and means for extracting the square root of said air velocity pressure of said air from said pneumatic output signal as said pneumatic output signal is being produced so that said pneumatic output signal is substantially linear with respect to said air velocity of said air flow in said passage whereby said transmitter comprises a linear air velocity transmitter, the improvement wherein said means for producing said output pneumatic signal comprises a bleed nozzle carried by said transmitter and a flapper lever pivotally carried by said transmitter for controlling said bleed nozzle, said means that senses the difference between the total pressure and the static pressure being operatively associated with said flapper lever to control the same, said means for extracting the square root of said air velocity pressure also being operatively associated with said flapper lever to control the same, said means for extracting said square root of said air velocity pressure comprising a movable moment-arm acting on said flapper lever.

10. A differential pressure transmitter as set forth in claim 9 wherein said means for extracting said square root comprises a movable wall carried by said transmitter and defining an output signal chamber therewith whereby the position of said wall is determined by the pressure in said output signal chamber, said wall being operatively interconnected to said moment-arm to position the same relative to said flapper lever in relation to the pressure in said output signal chamber.

11. A differential pressure transmitter as set forth in claim 10 wherein said moment-arm is movable generally parallel with said flapper lever.

12. A differential pressure transmitter as set forth in claim 11 wherein said moment-arm has an engagement part that engages said flapper lever, said means for extracting said square root comprising an inclined plane disposed adjacent said flapper lever, said engagement part of said moment-arm being intermediate and engageable with said flapper lever on one side thereof and said inclined plane on the other side thereof.

13. A differential pressure transmitter as set forth in claim 12 wherein said engagement part of said moment-arm comprises a roller.

14. A differential pressure transmitter as set forth in claim 12 wherein said engagement part of said moment-arm includes three side-by-side rollers, the outboard rollers engaging said inclined plane and the inboard roller engaging said flapper lever.

15. A differential pressure transmitter as set forth in claim 12 wherein said means for extracting said square root comprises a range spring acting on said inclined plane in a direction toward and substantially transverse to said flapper lever.

16. In a method of making a differential pressure transmitter comprising the steps of forming means for producing an output pneumatic signal from a pneumatic source in relation to the air velocity pressure of air flowing in a passage, forming means that senses the difference between the total pressure and the static pressure of said air flowing in said passage, and forming means for extracting the square root of said air velocity pressure of said air from said pneumatic output signal as said pneumatic output signal is being produced so that said pneumatic output signal is substantially linear with respect to said air velocity of said air flow in said passage whereby said transmitter comprises a linear air velocity transmitter, the improvement wherein said step of forming said means for extracting the square root comprises the step of forming said means for extracting the square root to include a substantially flat cam surface.

17. A method of making a differential pressure transmitter as set forth in claim 16 and including the step of forming said means that senses said difference between the total pressure and the static pressure to comprise a housing having a pair of chambers separated from each other by a flexible diaphragm whereby one of said chambers is for receiving said total pressure therein and the other of said chambers is for receiving said static pressure therein.

18. A method of making a differential pressure transmitter as set forth in claim 17 and including the step of forming said flexible diaphragm with a post that transmits movement of said diaphragm to said means for producing said output pneumatic signal.

19. A method of making a differential pressure transmitter as set forth in claim 18 and including the steps of forming said means for producing said output pneumatic signal to comprise a bleed nozzle and a pivotally mounted flapper lever for controlling said bleed nozzle, and operatively interconnecting said post to said flapper lever to control the same.

20. A method of making a differential pressure transmitter as set forth in claim 19 and including the steps of disposing a range spring in said transmitter, and operatively interconnecting said range spring to said flapper lever to tend to move said lever relative to said nozzle.

21. A method of making a differential pressure transmitter as set forth in claim 16 and including the step of forming said means for producing said output pneumatic signal to comprise a bleed nozzle carried by said transmitter and a flapper lever pivotally carried by said transmitter for controlling said bleed nozzle.

22. A method of making a differential pressure transmitter as set forth in claim 21 and including the step of operatively associating said means that senses the difference between the total pressure and the static pressure with said flapper lever to control the same.

23. A method of making a differential pressure transmitter as set forth in claim 22 and including the step of operatively associating said means for extracting the square root of said air velocity pressure with said flapper lever to also control the same.

24. In a method of making a differential pressure transmitter comprising the steps of forming means for producing an output pneumatic signal from a pneumatic source in relation to the air velocity pressure of air flowing in a passage, forming means that senses the difference between the total pressure and the static pressure of said air flowing in said passage, and forming means for extracting the square root of said air velocity pressure of said air from said pneumatic output signal as said pneumatic output signal is being produced so that said pneumatic output signal is substantially linear with respect to said air velocity of said air flow in said passage defining means whereby said transmitter comprises a linear air velocity transmitter, the improvement comprising the steps of forming said means for producing said output pneumatic signal to comprise a bleed nozzle carried by said transmitter and a flapper lever pivotally carried by said transmitter for controlling said bleed nozzle, operatively associating said means that senses the difference between the total pressure and the static pressure with said flapper lever to control the same, operatively associating said means for extracting the square root of said air velocity pressure with said flapper lever to also control the same, and forming said means for extracting said square root of said air velocity pressure to comprise a movable moment-arm acting on said flapper lever.

25. A method of making a differential pressure transmitter as set forth in claim 24 and including the steps of forming said means for extracting said square root to comprise a movable wall carried by said transmitter and defining an output signal chamber therewith whereby the position of said wall is determined by the pressure in said output signal chamber, and operatively interconnecting said wall to said moment-arm to position the same relative to said flapper lever in relation to the pressure in said output signal chamber.

26. A method of making a differential pressure transmitter as set forth in claim 25 and including the step of disposing said moment-arm to be movable generally parallel with said flapper lever.

27. A method of making a differential pressure transmitter as set forth in claim 26 and including the steps of forming said moment-arm with an engagement part that engages said flapper lever, forming said means for extracting said square root to comprise an inclined plane disposed adjacent said flapper lever, and disposing said engagement part of said moment-arm to be intermediate and engageable with said flapper lever on one side thereof and said inclined plane on the other side thereof.

28. A method of making a differential pressure transmitter as set forth in claim 27 and including the step of forming said engagement part of said moment-arm to comprise a roller.

29. A method of making a differential pressure transmitter as set forth in claim 27 and including the steps of forming said engagement part of said moment-arm to include three side-by-side rollers, engaging the outboard rollers against said inclined plane, and engaging the inboard roller against said flapper lever.

30. A method of making a differential pressure transmitter as set forth in claim 27 and including the step of forming said means for extracting said square root to comprise a range spring acting on said inclined plane in a direction toward and substantially transverse to said flapper lever.

31. In a pneumatically operated square root extracting device having means for extracting the square root of an input signal from an output pneumatic signal thereof and comprising a movable moment-arm acting on a flapper lever that controls a bleed nozzle of said device, said device having a movable wall carried by said device and defining an output signal chamber therewith whereby the position of said wall is determined by the pressure in said output signal chamber, said wall being operatively interconnected to said moment-arm to position the same relative to said flapper lever in relation to the pressure in said output signal chamber, said moment-arm having an engagement part that engages said flapper lever, the improvement comprising an inclined plane disposed adjacent said flapper lever, said engagement part of said moment-arm being engageable with said flapper lever and said inclined plane.

32. A device as set forth in claim 31 wherein said engagement part of said moment-arm comprises a roller.

33. A device as set forth in claim 31 wherein said engagement part of said moment-arm includes three side-by-side rollers, the outboard rollers engaging said inclined plane and the inboard roller engaging said flapper lever.

34. A device as set forth in claim 31 wherein a range spring acts on said inclined plane in a direction toward and substantially transverse to said flapper lever.

35. A device as set forth in claim 31 wherein a flexible parallelogram arrangement adjustably mounts said inclined plane to said device.

36. In a method of making a pneumatically operated square root extracting device having means for extracting the square root of an input signal from an output pneumatic signal thereof and comprising a movable moment-arm acting on a flapper lever that controls a bleed nozzle of said device, said device having a movable wall carried by said device and defining an output signal chamber therewith whereby the position of said wall is determined by the pressure in said output signal chamber, said wall being operatively interconnected to said moment-arm to position the same relative to said flapper lever in relation to the pressure in said output signal chamber, said moment-arm having an engagement part that engages said flapper lever, the improvement comprising the steps of disposing an inclined plane adjacent said flapper lever, and disposing said engagement part of said moment-arm so as to be engageable with said flapper lever and said inclined plane.

37. A method of making a device as set forth in claim 36 and including the step of forming said engagement part of said moment-arm to comprise a roller.

38. A method of making a device as set forth in claim 37 and including the steps of forming said engagement part of said moment-arm to include three side-by-side rollers, engaging the outboard rollers against said inclined plane, and engaging the inboard roller against said flapper lever.

39. A method of making a device as set forth in claim 36 and including the step of disposing a range spring to act on said inclined plane in a direction toward and substantially transverse to said flapper lever.

40. A method of making a device as set forth in claim 36 and including the step of forming a flexible parallelogram arrangement that adjustably mounts said inclined plane to said device.

* * * * *